United States Patent
Carr et al.

(10) Patent No.: US 7,743,167 B2
(45) Date of Patent: Jun. 22, 2010

(54) METHOD AND SYSTEM FOR SERVICING REQUESTS IN A DYNAMIC CLUSTER

(75) Inventors: Harold Carr, Salt Lake City, UT (US); Ken M. Cavanaugh, Montara, CA (US)

(73) Assignee: Oracle America, Inc., Redwood Shores, CA (US)

( * ) Notice: Subject to any disclaimer, the term of this patent is extended or adjusted under 35 U.S.C. 154(b) by 759 days.

(21) Appl. No.: 11/604,004

(22) Filed: Nov. 22, 2006

(65) Prior Publication Data

US 2007/0124380 A1    May 31, 2007

Related U.S. Application Data

(60) Provisional application No. 60/739,702, filed on Nov. 23, 2005.

(51) Int. Cl.
G06F 15/173 (2006.01)
G06F 11/00 (2006.01)
G06F 13/00 (2006.01)

(52) U.S. Cl. .............................. 709/242; 714/3; 719/315

(58) Field of Classification Search ................. 709/225, 709/242; 714/3; 718/104, 105; 719/315, 719/316

See application file for complete search history.

(56) References Cited

U.S. PATENT DOCUMENTS

| 5,832,514 | A  | * | 11/1998 | Norin et al. ................. 707/202 |
| 6,044,409 | A  | * | 3/2000  | Lim et al. .................... 719/315 |
| 2002/0042693 | A1 | * | 4/2002  | Kampe et al. ............... 702/186 |
| 2002/0129095 | A1 | * | 9/2002  | Hatalkar ..................... 709/203 |
| 2002/0154782 | A1 | * | 10/2002 | Chow et al. ................. 380/278 |
| 2004/0170155 | A1 | * | 9/2004  | Omar et al. ................. 370/349 |
| 2005/0025135 | A1 | * | 2/2005  | Chitrapu ..................... 370/352 |
| 2006/0070082 | A1 | * | 3/2006  | Sridhar et al. ............... 719/318 |
| 2008/0163004 | A1 | * | 7/2008  | Yu ............................. 714/38 |

OTHER PUBLICATIONS

"Common Object Request Broker Architecture: Core Specification"; (Mar. 2004) pp. 23-1 through 23-106, v. 3.0.3., Object Management Group.
Narasimhan, P. et al.; "Gateways for Accessing Fault Tolerance Domains"; Middleware 2000 LNCS 1795 pp. 88-103.

* cited by examiner

Primary Examiner—Larry Donaghue
Assistant Examiner—Brian J Gillis
(74) Attorney, Agent, or Firm—Osha • Liang LLP

(57) ABSTRACT

A method for servicing requests in a dynamic cluster that includes receiving, by a first replica of the dynamic cluster, a first request that includes a first membership label from a client, wherein the client stores the first membership label and a first cluster list, determining whether the first membership label is obsolete, and sending a second membership label and a second cluster list to the client when the first membership label is obsolete, wherein the client updates the first cluster list with the second cluster list.

16 Claims, 8 Drawing Sheets

METHOD AND SYSTEM FOR SERVICING REQUESTS IN A DYNAMIC CLUSTER

CROSS-REFERENCE TO RELATED APPLICATIONS

This application claims benefit of U.S. Provisional Application Ser. No. 60/739,702 entitled "IIOP Failover in Dynamic Clusters," filed on Nov. 23, 2005 in the names of Harold Carr and Ken M. Cavanaugh and is hereby incorporated by reference.

BACKGROUND

A network is an interconnection of computer systems and various connection devices, such as switches, routers, etc. The interconnection allows a user on one of the computer systems to obtain functionality that may not exist on that computer system. For example, when a user wants to learn about a particular part on an automobile, the user may access the Internet through a personal computer system and retrieve the relevant information. In another example, when a particular program requires more processing power than that which is available locally, the program may be distributed across a network to a variety of computer systems which each process a portion of the program.

Since the inception of using interconnected computer systems, various configuration models, such as peer-to-peer systems, client-server, etc., have been designed. For example, each computer system in a peer-to-peer system is given equal status to process requests from other computer systems in the peer-to-peer system. In contrast, in a client-server model, clients transmit a request to one or more specifically designated servers which process the request.

One particular type of client-server model includes a collection of servers referred to as a cluster. The cluster includes multiple replicas. Replicas are computer systems that are able to process the same requests. Specifically, at least one application and/or data are identical across the replicas in the cluster. Thus, a client may send a request to any replica in the cluster and receive the same result regardless of the replica that processes the request.

Occasionally, replicas fail. Specifically, a replica may temporarily or permanently be unable to process requests in a reasonable timeframe. From the client perspective, the client may send a request to a failed replica. Upon not receiving a response within the reasonable timeframe, the client may recognize that the replica has failed and transmit the request to a different replica.

SUMMARY

In general, in one aspect, the invention relates to a method for servicing requests in a dynamic cluster that includes receiving, by a first replica of the dynamic cluster, a first request that includes a first membership label from a client, wherein the client stores the first membership label and a first cluster list, determining whether the first membership label is obsolete, and sending a second membership label and a second cluster list to the client when the first membership label is obsolete, wherein the client updates the first cluster list with the second cluster list.

In general, in one aspect, the invention relates to a system that includes a first replica that receives a first request that includes a first membership label from a client, determines whether the first membership label is obsolete, and sends a second membership label and a cluster list to the client when the first membership label is obsolete, wherein the client updates a client cluster list with the cluster list, and a second replica that receives a second request that includes the second membership label from the client, and sends a response based on the second request to the client, wherein the second replica is in the cluster list.

In general, in one aspect, the invention relates to a computer usable medium that includes computer readable program code embodied therein for causing a replica in a dynamic cluster to receive a request that includes a first membership label from a client, wherein the client stores the first membership label and a first cluster list, determine whether the first membership label is obsolete, and send a second membership label and a second cluster list to the client when the first membership label is obsolete, wherein the client updates the first cluster list with the second cluster list.

Other aspects of the invention will be apparent from the following description and the appended claims.

DETAILED DESCRIPTION

Figure 1:
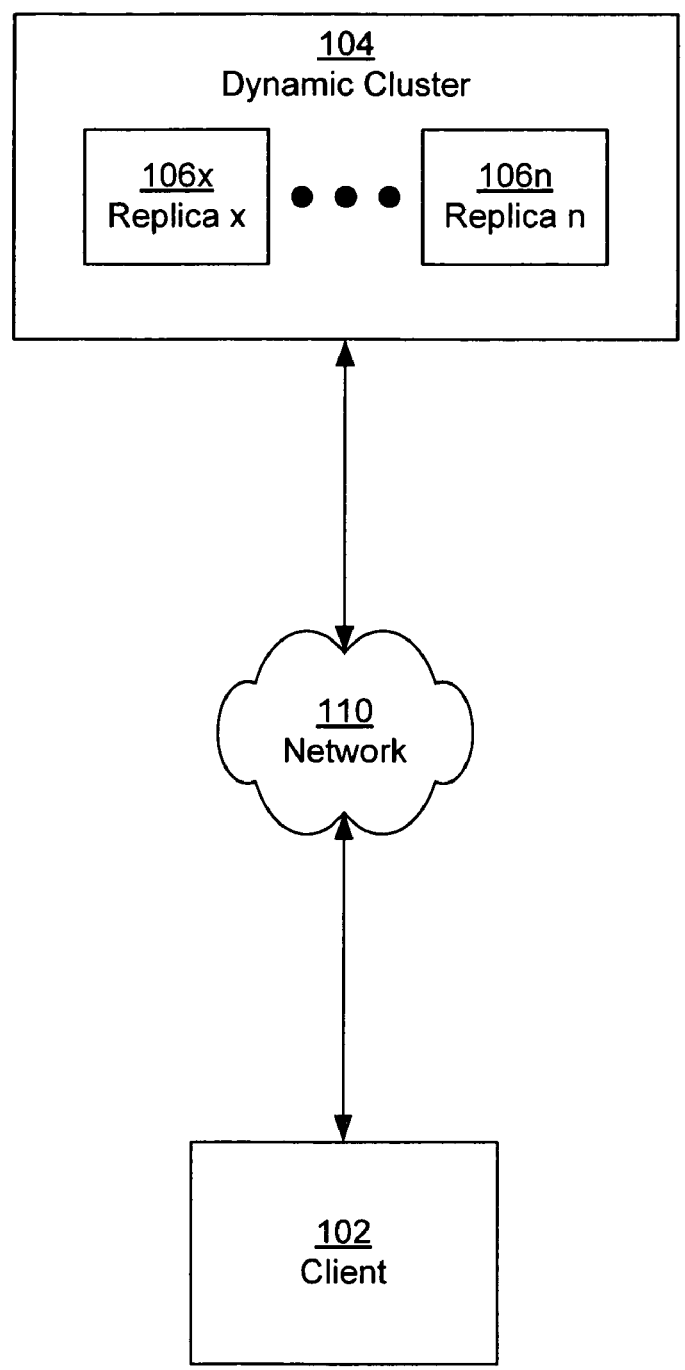
FIG. 1 shows a schematic diagram of a system for servicing requests in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for updating clients on the replicas in a cluster. Specifically, while processing requests from a client, embodiments of the invention identify whether the client's list of replicas is obsolete. If the client's list is obsolete, then embodiments of the invention update the client's list. In one or more embodiments of the invention, the client's list is included in the request, and the update (if required) is included in the response. When a replica that a client is using fails, the client may use a new replica chosen from the client's list of replicas.

FIG. 1 shows a schematic diagram of a system for servicing requests in accordance with one or more embodiments of the invention. As shown in FIG. 1, the system includes a client (102), a dynamic cluster (104), and a network (110). each of these components is described below.

A client (102) corresponds to any type of computing device that includes functionality to generate a request. The client (102) is described below in FIG. 3 in accordance with one or more embodiments of the invention. While FIG. 1 shows a client as being separate from the dynamic cluster, alternatively, a client may correspond to a replica (described below) in the dynamic cluster (104). Specifically, a replica in the dynamic cluster (104) may require a service of another replica.

A dynamic cluster (104) is connected to the client via a network (110) (e.g., Wide Area Network (WAN), Local Area Network (LAN), etc. or any combination of networks) in accordance with one or more embodiments of the invention. A dynamic cluster (104) corresponds to a collection of replicas (e.g., replica x (106x), replica n (106n)) in accordance with one or more embodiments of the invention. The dynamic cluster (104) is dynamic in terms of the members of the dynamic cluster (104). Specifically, in one or more embodiments of the invention, replicas (e.g., replica x (106x), replica n (106n)) in the dynamic cluster (104) may be added, be removed, be halted, fail, etc. Thus, the membership of the dynamic cluster (104) may change and/or the status (e.g., active, halted, failed, removed, etc.) of each member may change.

Replicas (e.g., replica x (106x), replica n (106n)) in the dynamic cluster (104) are able to process some of the same types of requests from a client. Specifically, at least one service is replicated across the replicas (e.g., replica x (106x), replica n (106n)) in accordance with one or more embodiments of the invention. Thus, a client may send a request to any replica (e.g., replica x (106x), replica n (106n)) and receive the same response (described below in FIG. 2).

In one or more embodiments of the invention, the request corresponds to a Common Object Request Broker Architecture (CORBA®) request. CORBA® is the standard distributed object architecture developed by the Object Management Group (OMG™) consortium (CORBA® is the registered trademark of OMG™, located in Needham, Mass.). One of the standards developed by the OMG™ is a specification of architecture for an open software bus, or Object Request Broker (ORB), on which object components written by different vendors can interoperate across networks and operation systems. In CORBA®, a client application is not required to have knowledge of the location of the CORBA® object, implementation details of the CORBA® object, use the same language as the object, etc.

The interface of the CORBA® object is defined using the OMG™ Interface Definition Language (IDL). CORBA® objects can be written in any programming language for which there is mapping from the IDL to that language (e.g., Java™ developed by Sun Microsystems™, Inc. (located in Santa Clara, Calif.), C++, C, Smalltalk, COBOL, and ADA). The IDL defines an object type and specifies a set of named methods, parameters, and any exception types that these methods may return. An IDL compiler translates the CORBA® object's interface into a specific programming language according to an appropriate OMG language mapping.

Rather than using an IDL, some languages, such as Java™, permit the definition of a remote object interfaces directly in the language without requiring the use of IDL. Such languages may use the OMG Remote Method Invocation (RMI)-Internet Inter-ORB Protocol (IIOP) standard. Thus, RMI-IIOP may be used instead of IDL.

Accordingly, in one or more embodiments of the invention, both the client (102) and each replica (e.g., replica x (106x), replica n (106n)) in the dynamic cluster (104) include functionality to process CORBA® requests and responses.

Figure 2:
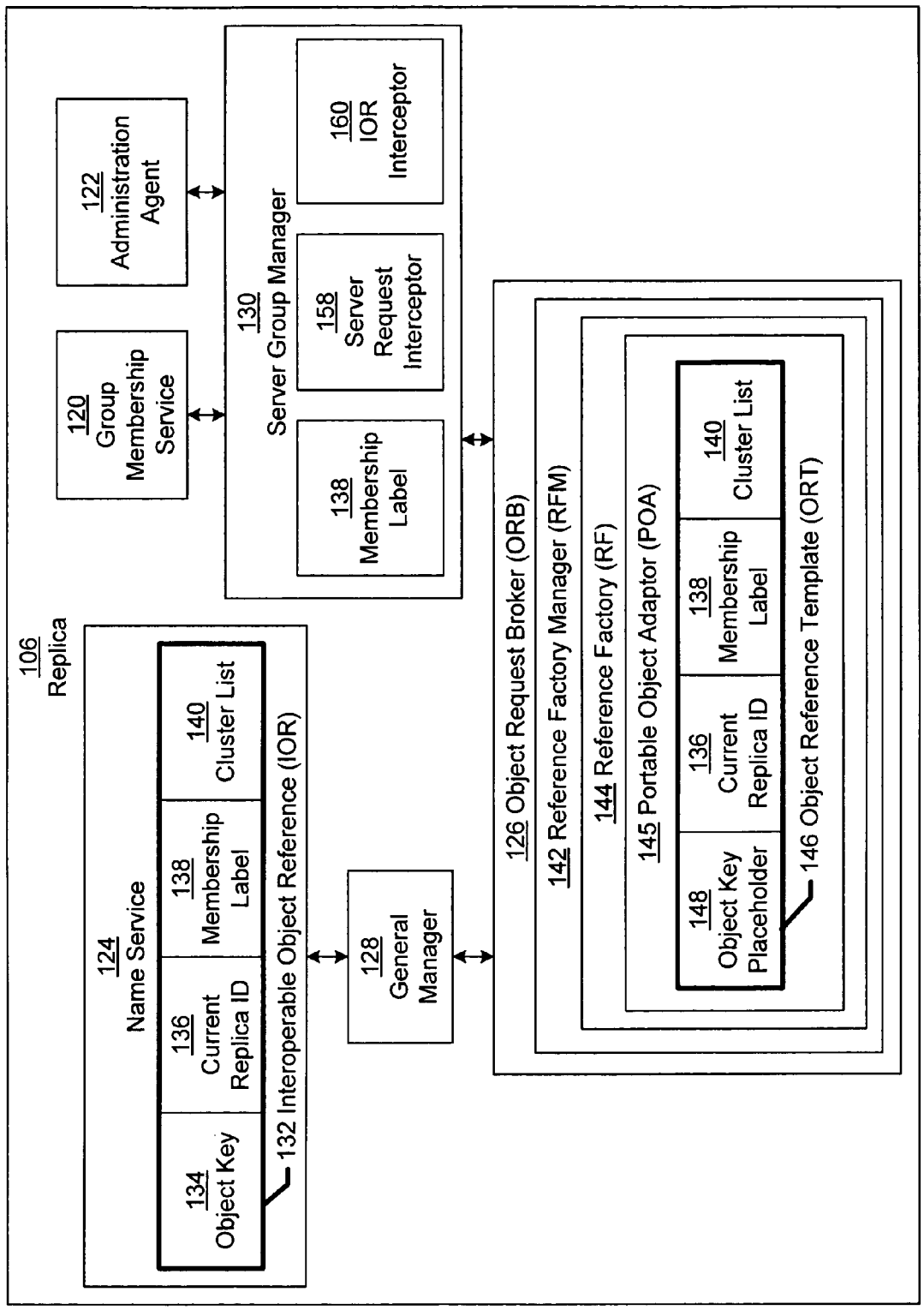
FIG. 2 shows a schematic diagram of a replica in accordance with one or more embodiments of the invention.

FIG. 2 shows a schematic diagram of a replica (106) in accordance with one or more embodiments of the invention. As shown in FIG. 2, a replica (106) includes a group membership service (120), an administration agent (122), a name service (124), an object request broker (126), a general manager (128), and a server group manager (130). Each of these components is described below.

A group membership service (120) includes functionality to detect membership changes within the dynamic cluster. A membership change occurs in the dynamic cluster when a replica is added, is removed, halts, fails, restarts, etc. Specifically, a membership change occurs when there is a change as to which replicas are members of the dynamic cluster. Detection of a membership change may involve various techniques, such as not receiving an expected "heartbeat message" from a replica, being informed that a change has occurred, etc. The group membership service (120) may be configured to communicate with other replicas (not shown) in the dynamic cluster and/or with a centralized membership service that services all or part of the replicas in the dynamic cluster.

In addition to the group membership service (120), a replica (106) also includes an administration agent (122). The administration agent (122) includes functionality to maintain administration information about replicas in the dynamic cluster. Administration information may include, for example, address information for each replica, name information for each replica, and/or priority information (e.g., estimated throughput, request processing time, etc.).

The replica (106) also includes a service (e.g., name service (124)) in accordance with one or more embodiments of the invention. In some embodiments of the invention, a service may be any standard CORBA service that returns object references as results. In one or more embodiments of the invention, the service may be a name service (124). The name service (124) includes functionality to allow a client to identify an object with a human-readable name. Specifically, the name service (124) includes functionality to register objects and maintain a mapping between names and objects.

An IOR (132) is a language independent reference that is used to reference a servant. The servant is typically a language dependent component. Specifically, the servant corresponds to an object in a program upon which a client wants to perform a method or function. The IOR (132) is the reference that a client may use to access the services provided by the servant. An IOR (132) includes an object key (134), a current replica identifier (136), membership label (138), and a cluster list (140). Each of these components is described below.

An object key (134) includes information used by the ORB (126) to dispatch requests. The object key also includes an object identifier. Specifically, an object key (134) identifies a particular portable object adaptor (POA) (145) (described below) for an object.

The current replica identifier (136) corresponds to information about the replica (106). Specifically, the current replica identifier (136) specifies the replica that should be used for all requests until failure occurs. Accordingly, the current replica identifier (136) may include the name of the replica (106), the address (e.g., hostname and port) of the replica (106), etc.

The membership label (138) corresponds to an identifier for the members of the dynamic cluster. Specifically, a change in the members of the dynamic cluster results in a change in the membership label (138). The membership label (138) may correspond to any identification mechanism, such as a timestamp, the replica address (e.g., Internet Protocol address) with a counter, an identifier shared by multiple replicas, a shortened version of the names of the members of the dynamic cluster, etc. The membership label (138) may or may not be identical across all replicas for the same set of members of the dynamic cluster. In some embodiments of the invention, the membership label (138) may be guaranteed to not be identical on any two replicas at any time. Specifically, the membership label (138) may correspond to a universally unique identifier (UUID).

In addition to a membership label (138), the IOR (132) also includes a cluster list (140). A cluster list (140) corresponds to a current listing of the members of the dynamic cluster. Members of the dynamic cluster may be identified in the cluster list (140) by a name, address (e.g., hostname and port), etc.

Additionally, the cluster list (140) may contain status information (e.g., receiving requests, halted, unknown, etc.) about the replicas. In one or more embodiments, a failed replica may be listed in the cluster list with the status information indicating that the replica has failed. In other embodiments, a failed replica is not listed in the cluster list. In one or more embodiments of the invention, the cluster list (140) is ordered based on a priority. Further, in one or more embodiments of the invention, the cluster list (140) may list only the members of the dynamic cluster having the corresponding servant specified by the IOR.

While FIG. 2 shows that a replica (106) includes the name service (124), the administration agent (122), and the group membership service (120), alternatively, any or all of the aforementioned components may be located on a different replica or a different computer system of the dynamic cluster. For example, the aforementioned components may provide centralized functionality to multiple replicas and/or may be located on a separate computer system from the replica (106).

Continuing with FIG. 2, the replica (106) also includes an object request broker (ORB) (126). The ORB (126) includes functionality to intercept a call from a client, find a servant that can implement a request, pass the servant a plurality of parameters according to the request, invoke the method, and return the results.

An ORB (126) includes a reference factory manager (RFM) (142) in accordance with one or more embodiments of the invention. An RFM (142) includes functionality to create, track, destroy, and recreate POAs (145) (described below). Moreover, the RFM (142) includes functionality to manage instances of reference factories (RF) (144).

A reference factory (RF) (144) includes functionality to create an IOR (132). More specifically, the RF (144) includes functionality to identify the appropriate POA (145) and instigate creating an IOR (132) using an object reference template (ORT) (146) (described below).

A POA (145) corresponds to a mechanism that connects a request using an IOR with the proper servant to handle the request. In one or more embodiments of the invention, POAs are persistent and therefore may survive a restart of the replica. Policies of the POA (145) describe characteristics of objects implemented in the POA (145). These policies may include functionality to generate and interpret object references, invoke methods on a servant, provide security through interactions with the servant, map object references, and register a servant.

A POA includes functionality to maintain object reference templates (ORTs) (146). An ORT (146) corresponds to a template from which an IOR (132) may be created. Thus, in one or more embodiments of the invention, an ORT (146) includes an object key placeholder (148), a current replica identifier (136), a membership label (138), and a cluster list (140). The object key placeholder (148) corresponds to an area in which the object key (134) is added when the IOR is created (132). The current replica identifier (136), the membership label (138), and the cluster list (140) are similar to the respective components in the IOR (132).

Continuing with FIG. 2, a general manager (128) is interposed between the name service (124) and the ORB (126) in accordance with one or more embodiments of the invention. A general manager (128) includes functionality to facilitate the management of creating an IOR and facilitate requests from a client. In one or more embodiments of the invention, the general manager (128) corresponds to an Enterprise JavaBeans™ (EJB) application that is Java 2 Enterprise Edition (J2EE™) compliant. JavaBeans™ and J2EE™ are trademarks of Sun Microsystems, Inc. located in Santa Clara, Calif.

A server group manager (130) is interposed between the group membership service (120) and the ORB (126) in accordance with one or more embodiments of the invention. A server group manager (130) includes functionality to receive notification of membership changes in the dynamic cluster from the group membership service (120) and update clients on the membership changes. The server group manager (130) includes a membership label (138), a server request interceptor (158), and the IOR interceptor (160).

The membership label (138) maintained by the server group manager corresponds to the most recent membership label known to the replica (106). A server request interceptor (158) includes functionality to intercept requests from a client and update the client, if necessary, on membership changes to the dynamic cluster in accordance with one or more embodiments of the invention. The IOR interceptor (160) includes functionality to intercept the creation of new IORs and add in the membership label and cluster list.

Figure 3:
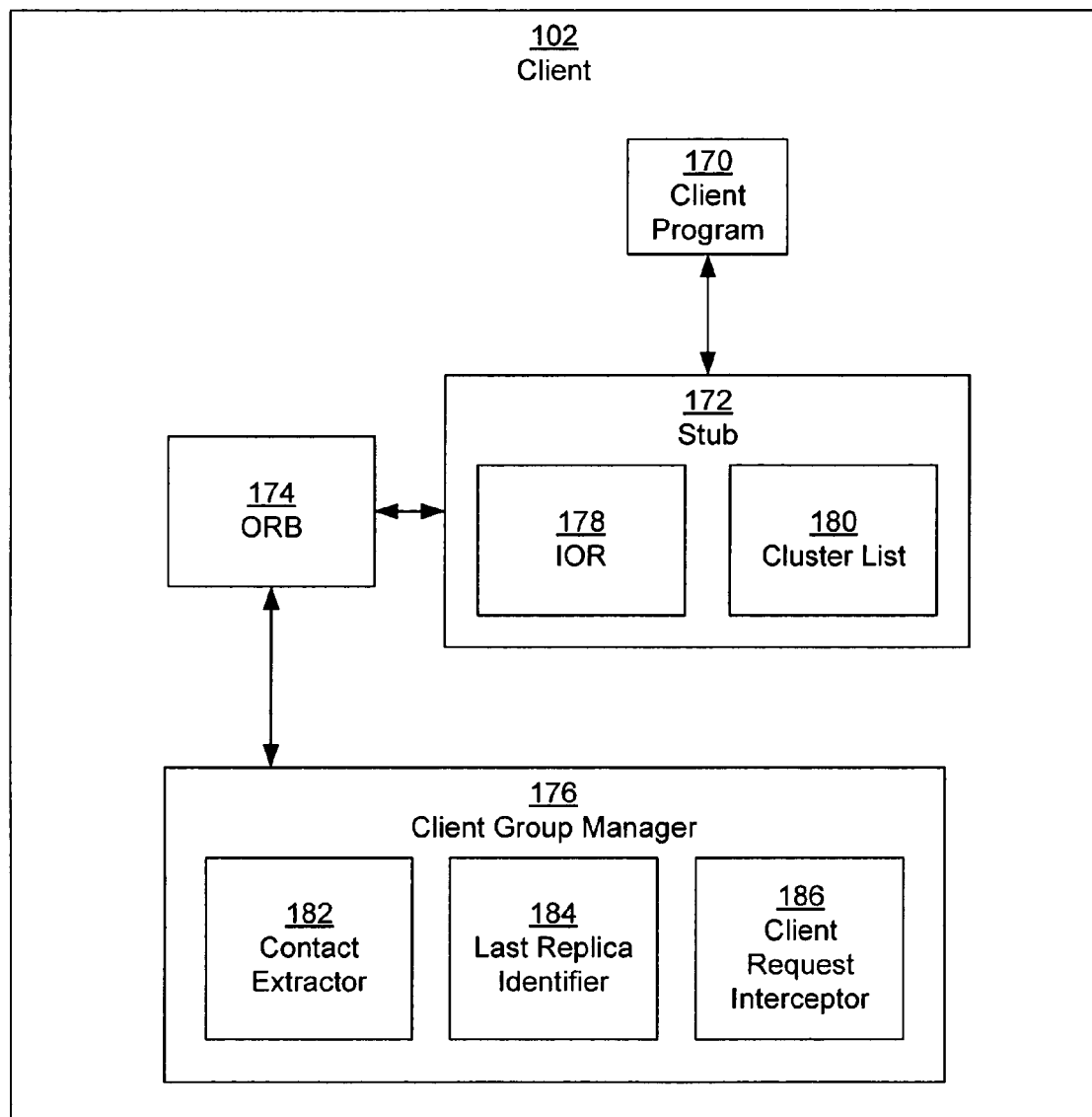
FIG. 3 shows a schematic diagram of a client in accordance with one or more embodiments of the invention.

FIG. 3 shows a schematic diagram of a client (102) in accordance with one or more embodiments of the invention. As shown in FIG. 3, the client (102) includes a client program (170), a stub (172), an ORB (174), and a client group manager (176). Each of these components is described below.

A client program (170) corresponds to any type of program or application that initiates a request for a service. The client program (170) may correspond to an external program, to a program on a replica, etc. The client program (170) is connected to a stub (172).

A stub (172) includes functionality to marshal requests and parameters of the request into a standardized format. Specifically, a stub (172) includes functionality to translate the language of the client program (170) into an IDL (described above). A stub (172) includes an IOR (178), which includes a cluster list (180). The IOR (178) corresponds to the client's copy of the object reference by which the client may identify the servant on the replica. The cluster list (180) corresponds to the list of members of the dynamic cluster of which the client (102) is aware.

An ORB (174) is connected to the stub (172). An ORB (174) corresponds to a client-side mediator of the request and any received response. The ORB (174) includes functionality to iterate through the cluster list (180), sending the request to each replica in turn until an operable replica that can process the request is found (i.e., the operable replica transmits a response to the request). An ORB (174) on the client (102) also includes functionality to manage the communication with the operable replica.

A client group manager (176) is connected to the ORB (174). The client group manager (176) includes functionality to ensure that the client is updated when changes are made to the cluster list in accordance with one or more embodiments of the invention. The client group manager (176) includes a contact extractor (182), a last replica identifier (184), and a client request interceptor (186).

The contact extractor (182) includes functionality to extract the cluster list (180) from the IOR that is sent by the replica. Specifically, the contact extractor (182) includes functionality to intercept responses from the replica and obtain a new cluster list (if such a list is present) in accordance with one or more embodiments of the invention. The last replica identifier (184) corresponds to a storage area for identifying the replica that last communicated with the client. The last replica identifier (184) assures that the client uses the same replica until the replica fails. The client request interceptor (186) includes functionality to intercept requests to the replica and add the current membership label known to the client to the request.

Figure 4:
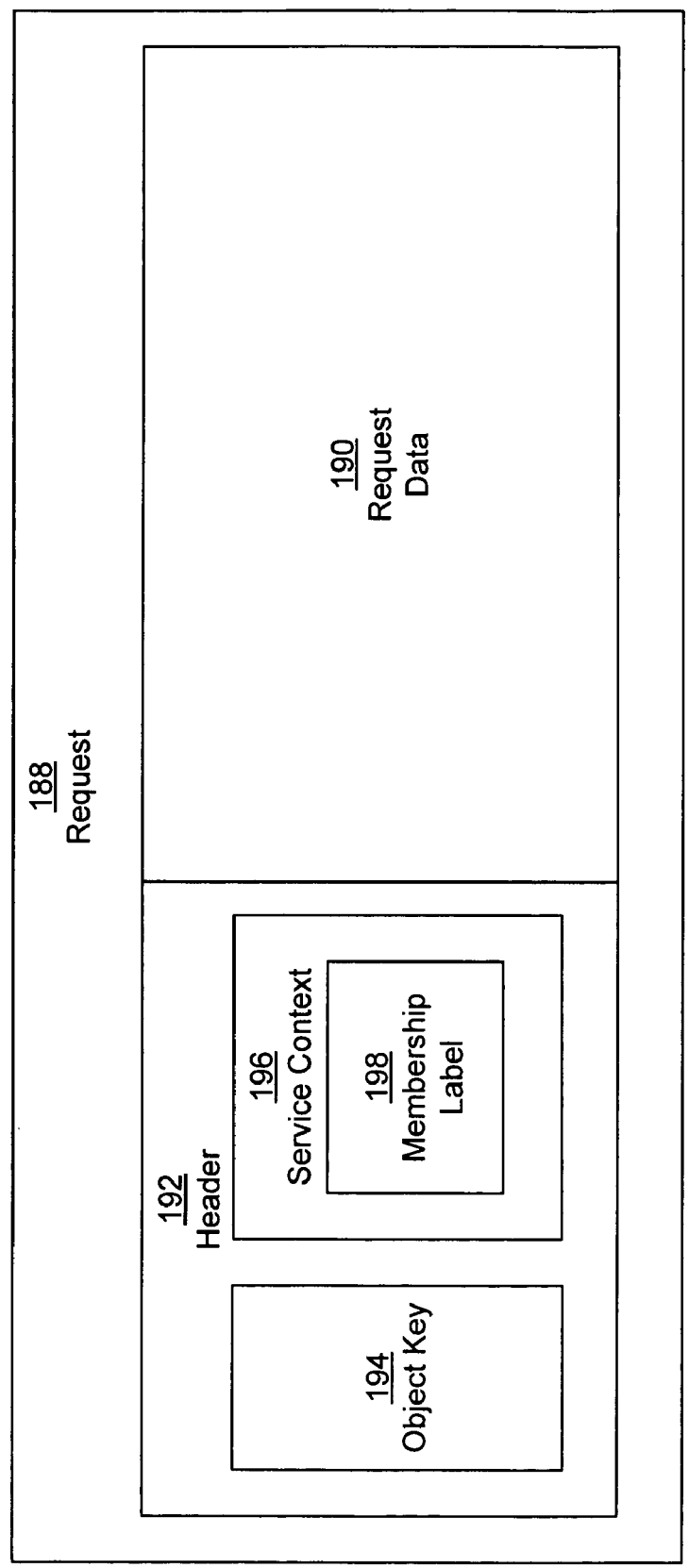
FIG. 4 shows a schematic diagram of a request in accordance with one or more embodiments of the invention.

FIG. 4 shows a schematic diagram of a request (188) in accordance with one or more embodiments of the invention. As shown in FIG. 4, the request (188) includes request data (190) and a header (192). Request data (190) corresponds to the method invocation and the parameters of the request. The header (192) corresponds to replica administrative information required for processing the request in accordance with one or more embodiments of the invention. The header (192) includes an object key (194) and a service context (196).

The object key (194) corresponds to a copy of the object key in the IOR (described in FIG. 2) in one or more embodiments of the invention. The service context (196) corresponds to a field that may be used to transmit control information. The service context (196) may include one or more service context entries. Each service context entry may include a unique identifier. Thus, a request interceptor (i.e., a client request interceptor or a server request interceptor) may access the specific service context entry applicable to the request interceptor. One of the service context entries is a membership label (198). The membership label (198) corresponds to the most recent membership label known by the client (102). The membership label (198) is included with request (188) so that the replica may verify whether the client (102) is aware of the most recent cluster list. If the client's cluster list is not aware of the most recent cluster list, then the replica may send the most recent cluster list and a new membership label to the client (102) with the response to the request (188).

Figure 5:
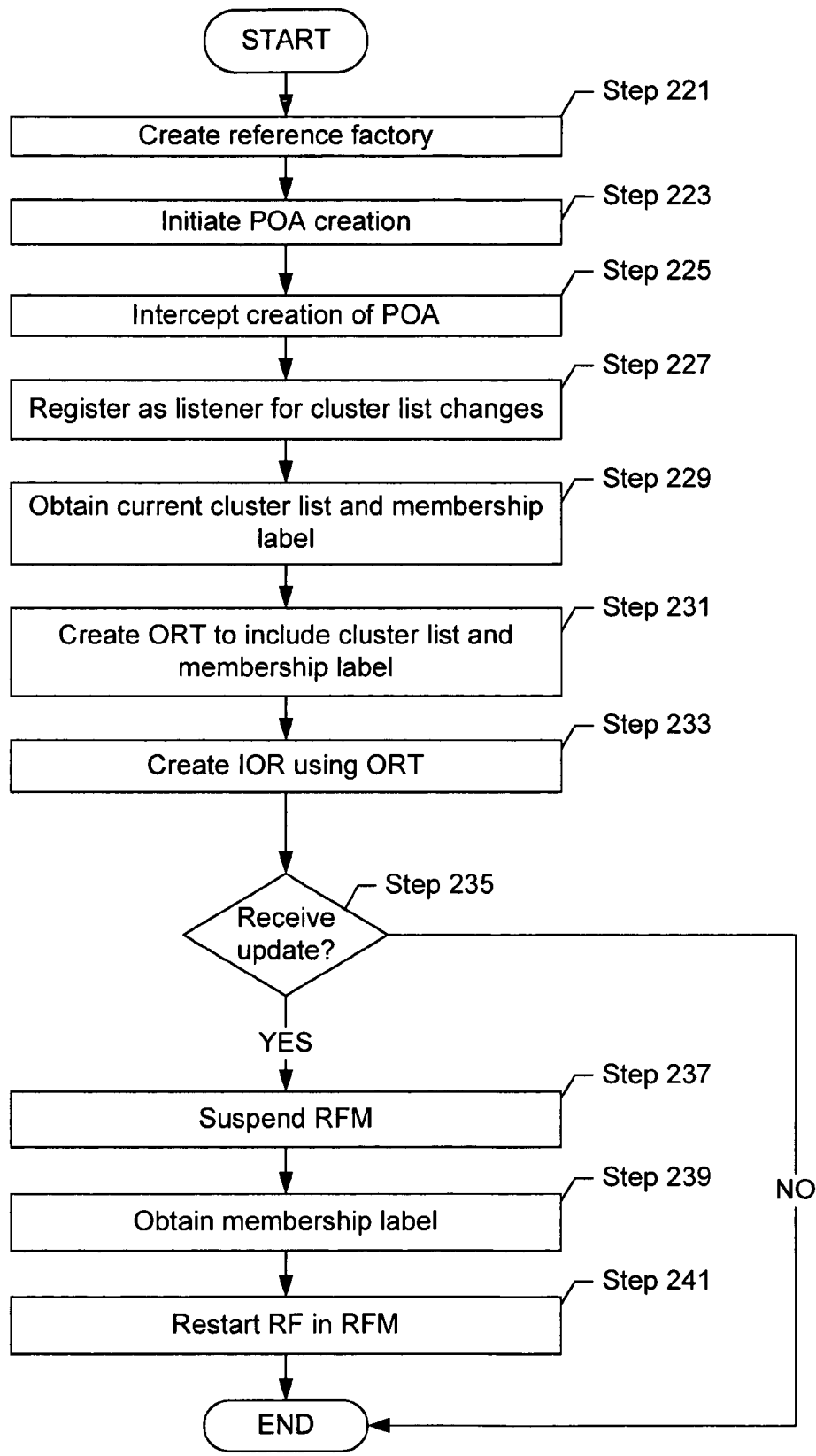
FIG. 5 shows a flowchart of a method for configuring and updating a replica in accordance with one or more embodiments of the invention.
Figure 6:
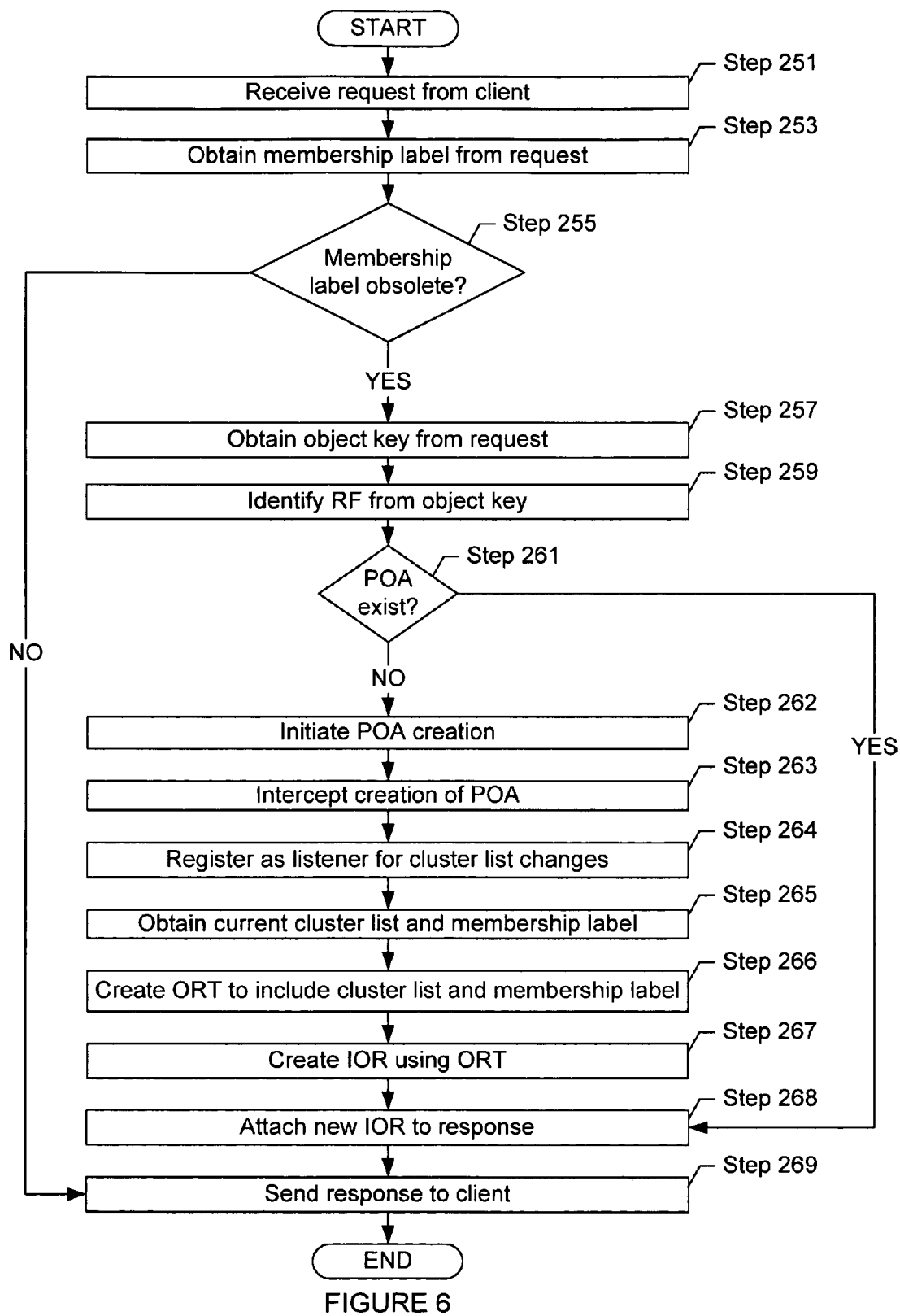
FIG. 6 shows a flowchart of a method for servicing requests by a dynamic cluster in accordance with one or more embodiments of the invention.
Figure 7:
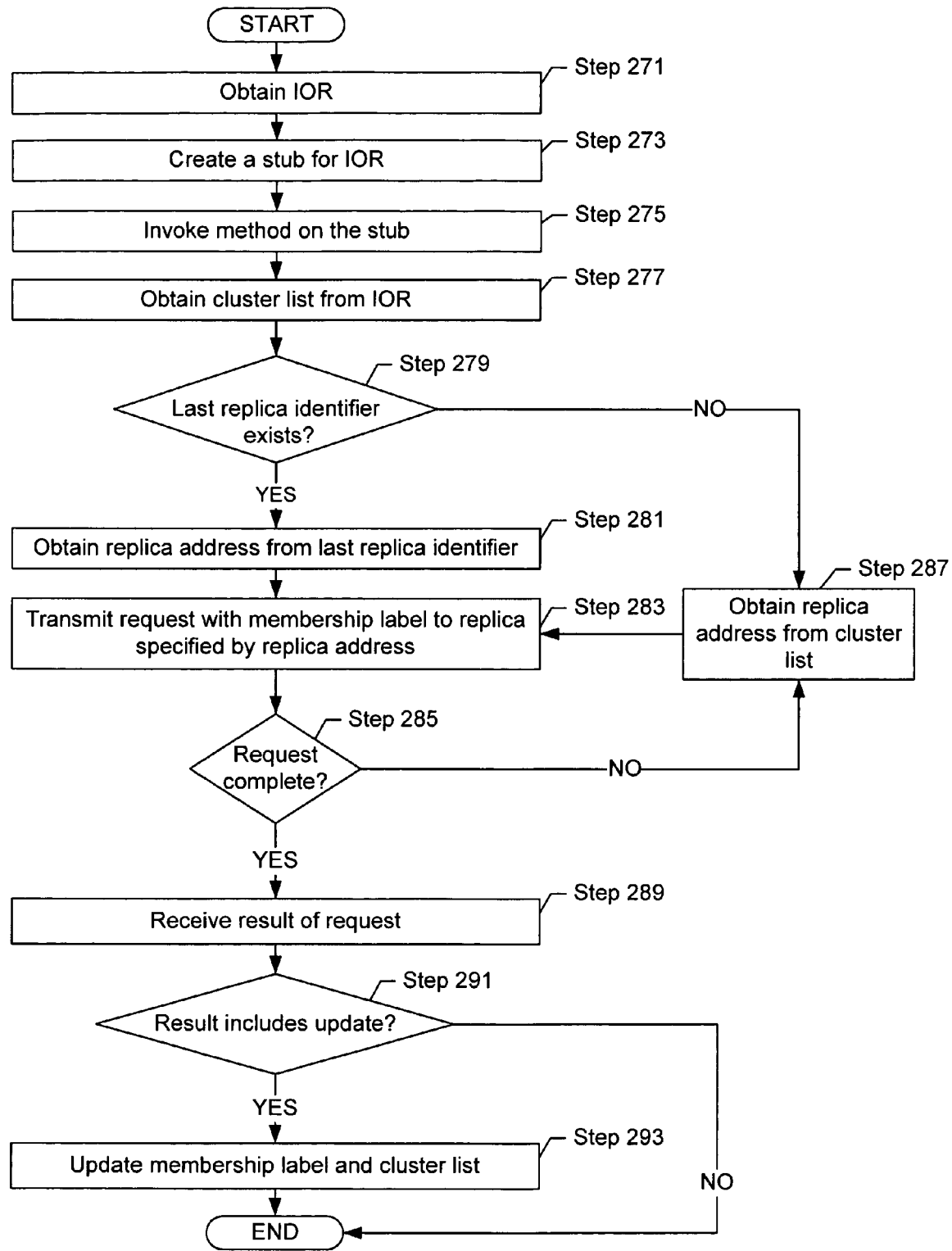
FIG. 7 shows a flowchart of a method for processing a request by a client in accordance with one or more embodiments of the invention.

In order for requests to be serviced by the replica (106) and the client (102) updated, if required, as to the new membership label and cluster list, the replica is configured and periodically updated. FIG. 5 shows a flowchart of a method for configuring and updating a replica in accordance with one or more embodiments of the invention. While the various steps in the flowcharts shown in FIGS. 5-7 are presented and described sequentially, one of ordinary skill will appreciate that some or all of the steps may be executed in different orders and some or all of the steps may be executed in parallel.

Initially, an RF is created (Step 221). The RF is created by the RFM in accordance with one or more embodiments of the invention. When creating the RF, information that is used to create an IOR is recorded. In one or more embodiments of the invention, two RFs are created, one with an EJB home interface and another with an EJB remote interface. The EJB home interface allows a client to manipulate methods that are not associated with any particular instance of an EJB. The EJB remote interface allows a client to access a specific instance of an EJB.

After the reference factory is created, creating the POA is initiated (Step 223). In one or more embodiments of the invention, initiating the creation of the POA may occur at any time after the reference factory is created and before a first request arrives. For example, the POA may be created when the first instance of the EJB is created. In some embodiments creation of the POA is delayed until the first request is received. In such embodiments, an adaptor activator mechanism may be used to create the POA. An adaptor activator is an object that a programmer may create and associate with a POA. When a request is received for a POA that does not exist, the ORB on the replica invokes the adaptor activator to create the required POA on demand.

Once creation of the POA is initiated, the creation of the POA is intercepted (Step 225). Specifically, an IOR interceptor is triggered by the creation of the POA. The triggering of the IOR interceptor may be performed by the ORB.

Further, registration as a listener for cluster list changes is performed (Step 227) in accordance with one or more embodiments of the invention. Specifically, at any time, the server group manager for the replica registers as a listener for cluster list changes. In some embodiments, the server group manager registers only once for cluster membership changes. In one or more embodiments of the invention, the server group manager registers with the group membership service that maintains a listing of the registered listeners.

When the replica is initially configured, an administration agent may be configured with the current cluster list. During the initial configuration of the replica, the server group manager may generate an initial membership label and may obtain the current cluster list from the administrative agent. The server group manager may update the current cluster list by registering as a listener to the group membership service. The group membership service may obtain notification from other replicas, a client, a centralized server, etc. of changes in the cluster list. In response to the changes, the group membership service may notify the registered listeners (e.g., the server group manager) of the group membership service that a cluster list change has occurred.

Regardless of when the server group manager registers as a listener for the cluster list changes, the current cluster list and the membership label is obtained (Step 229). Specifically, the IOR interceptor obtains the membership label and the cluster list.

Next, an ORT is created to include the cluster list and the membership label (Step 231). The membership label and the cluster list may be added by the IOR interceptor as tagged components to the ORT. Also, at this stage the current replica identifier is added to the ORT so that the ORT includes a reference to the replica that creates the ORT. When the ORT is created, the creation of the POA is finalized and the ORT is added to the RF. Once the ORT is created, any number of IORs may be created from the ORT without repeating the process described above in accordance with one or more embodiments of the invention. After adding the ORT to the RF, a new IOR is created using the ORT (Step 233). Specifically, a new reference is created that specifies a particular object key.

At any time after the server group manager registers as a listener for the cluster list changes, the server group manager may receive an update to the cluster list changes. Thus, a determination is made whether an update is received (Step 235). The update may be received in the form of a signal or a trigger, by polling the group membership service, or performing any other technique known in the art for receiving such notifications. If an update is not received, then the replica continues processing.

Alternatively, when an update is received, then the RFM is suspended in accordance with one or more embodiments of the invention (Step 237). Specifically, the RFM is suspended so as to stop processing requests. The suspension occurs without causing observable errors in the clients. In one or more embodiments of the invention, suspending the RFM may be performed by suspending requests within the replica. Alternatively, suspending the RFM may be accomplished by rejecting requests and sending an error message to each client to indicate that the client may safely retry the request.

Next, the membership label is obtained (Step 239). Specifically, the membership label is obtained by the server group manager. The server group manager may obtain the membership from another replica, client, etc., for example, as part of the notification of the cluster list change. Alternatively, the server group manager may generate a new membership label.

Further, the RFs in the RFM are restarted (Step 241). Restarting the RF destroys the POAs on the replica. The POAs may be recreated on demand by updating the relevant ORT and using an adaptor activator mechanism (described above). Accordingly, the RFM is reinstated. Specifically, processing by the RFM is restarted once the replica is updated with the new cluster list.

FIG. 6 shows a flowchart of a method for servicing requests by a dynamic cluster in accordance with one or more embodiments of the invention. Initially, a request is received from the client (Step 251). In one or more embodiments, the request is transmitted using IIOP (i.e., an OMG general inter-ORB protocol (GIOP) over transport control protocol (TCP)) and processed accordingly. The request is then received from the appropriate socket of the replica in accordance with one or more embodiments of the invention.

The request is then intercepted by an interceptor. In particular, the server request interceptor on the replica is triggered. The server request interceptor accesses the service context of the request. Accordingly, the membership label is obtained from the request (Step 253). At this stage, the server request interceptor identifies the service context entry that is of interest to the server request interceptor. Identifying the service context entry may be performed by using the service context identifier. The membership label is extracted from the service context entry.

Accordingly, a determination is made whether the membership label is obsolete (Step 255). The membership label is determined to be obsolete when the membership label in the request does not match the membership label maintained by the replica.

The membership label may be determined to be obsolete even if the cluster list maintained by the client is current in accordance with one or more embodiments of the invention. Specifically, in the scenario in which each replica generates a separate membership label, the client may have an equally current or perhaps even more recent cluster list than the replica that receives the current request. For example, if the replica previously in communication with the client had a more recent cluster list than the current replica and the previous replica failed, then the client may begin communication with the current replica with a more recent cluster list than the current replica. However, the membership label may still be determined to be obsolete because the membership label in the request does not match the membership label of the current replica.

In the scenario in which the membership label is identical across the replicas or in which the membership label is standardized (i.e., a determination can be made as to which has the most recent cluster list based on the membership label), then the membership label is determined to be obsolete only when the replica has a more recent cluster list than the client.

If the membership label is determined to be obsolete, then the client is updated as to the most recent membership label and cluster list known to the replica. Thus, the new membership label and cluster list is sent to the client. Sending the new membership label and cluster list may involve a variety of mechanisms. The new membership label and cluster list may be added directly to the response after the request is processed, as part of processing the request, or before processing the request.

For example, a separate response may be created that includes the membership label and the cluster list in accordance with one or more embodiments of the invention. The separate response may be transmitted to the client before, during, after, or in lieu of processing the request by the servant for the client.

Alternatively, the membership label and cluster list may be transmitted to the client by updating the IOR known to the client. If the membership label is determined to be obsolete, then the object key from the request is obtained (Step 257). Specifically, the header is accessed to identify the object key. Using the object key, an RF is identified from the object key (Step 259). As discussed above, when the replica is configured, the RFs are created. The object key identifies the RF that has the POA or information to create a POA.

Accordingly, a determination is made whether a POA exists (Step 261). Specifically, a determination is made whether a POA exists in the RF. If a POA does not exist, then creating the POA is initiated (Step 262). Once creation of the POA is initiated, the creation of the POA is intercepted (Step 263). Further, registration as a listener for cluster list changes is performed (Step 264) in accordance with one or more embodiments of the invention. The current cluster list and the membership label are obtained (Step 265). Next, an ORT is created to include the cluster list and the membership label (Step 266). After adding the ORT to the RF, a new IOR is created using the ORT (Step 267) Steps 262-267 may be performed as described above and in FIG. 5.

Once the IOR is created, then the IOR is attached to the response (Step 268). The IOR may be attached to the response when the response is transmitted to the client, or may be attached to the response as the request is being processed. Specifically, the server request interceptor may finish processing the request by updating the IOR in the request. The request with the updated IOR may be passed to the servant for processing. If the request has the updated IOR, than any generated response may also have the updated IOR. Alternatively, a second server request interceptor may intercept the response to the client and update the IOR as part of intercepting the response.

Regardless of when the updated IOR is attached to the response, the updated IOR may be attached using the service context of the request. Specifically, because the service context is accessible by request interceptors, the request interceptors on the client and the server are able to read and attach IORs in the service context.

Continuing with FIG. 6, the response based on the request is sent to the client (Step 269). Specifically, if the membership label is determined obsolete, then the response includes the new membership label and cluster list. Inversely, if the membership label is not obsolete, then the request is sent without a new membership label and cluster list in accordance with one or more embodiments of the invention.

FIG. 7 shows a flowchart of a method for processing a request by a client in accordance with one or more embodiments of the invention. Initially, the client obtains an IOR (Step 271). Specifically, the client may obtain an IOR from the name service or other source, such as another request. The request for the IOR may be mediated by the ORB on the client and the replica. Further, the IOR may be the target or one of the results of the request. Accordingly, the IOR is transmitted to the client.

Next, a stub is created for the IOR (Step 273). In one or more embodiments of the invention, the stub is arranged to include a reference to the cluster list in the IOR. The stub may then act as a proxy for the client to use the remote service.

After creating the stub, a method on the stub is invoked (Step 275). Specifically, the client application invokes a method using the stub. If the stub has not been previously used, then a cluster list from the IOR is obtained (Step 277). The cluster list may be obtained by obtaining the tagged components of the IOR. Further, the cluster list may be obtained over time, such as obtaining the next replica information from the IOR only when the previous replica fails, or at once when the cluster list is received. Further, a priority may be set on the replicas listed in the cluster list. The priority may be set by the replica that transmits the IOR or by the client in accordance with one or more embodiments of the invention. For example, the priority may be set so that the client is less likely to communicate with the same replica as other clients.

Continuing with FIG. 7, when a method on the stub is invoked, a determination is made whether the last replica identifier exists (Step 279). Specifically, if a client is communicating, such as through a series of requests, with a specific replica, then the client continues communications with the same replica. This assures the client that even in the event of a replica failure, the client is accessing data and objects on the same replica. Thus, corruption due to having data on two different replicas may be avoided.

Therefore, if the last replica identifier exists, then the replica address is obtained from the last replica identifier (Step 281). Specifically, the ORB on the client identifies the last replica for which communication occurred.

Next, a request with the membership label is transmitted to the replica specified by the replica address (Step 283). The request includes the method invocation in accordance with one or more embodiments of the invention.

A determination is made whether the request is complete (Step 285). A request is complete if the replica processes the request and the client receives a reply. The reply to a complete request may be a successful result or an error. Specifically, the client may receive a response to the request. A request is not complete when the connection between the client and the replica fails or while the client attempts to send a request. Whether the connection failed before or after the replica processed the request may be indeterminable. If the request is not complete, the request may be retried in cases in which the client detected the failure before sending the request to the replica. If the failure is detected after sending the request to the replica, the request may not, in general, be retried. In one or more embodiments of the invention, the client only retries the request in the event of a failure detected before sending the request or if the request is idempotent. If the request is idempotent, then processing the request twice achieves the same result as processing the request once.

Thus, if a determination is made to retry the request (Step 285) or if the last replica identifier does not exist (Step 279), then a replica address is obtained from the cluster list (Step 287). Specifically, the next replica is identified from the cluster list. At this stage, the last replica identifier may be updated to reflect the next replica. Accordingly, communication with the next replica may proceed by transmitting the request with the membership label to the next replica (Step 283). Retrying replicas may repeat until a replica is found that is successful or until a determination is made that all replicas have failed.

When the request completes, then a result of the request is received (Step 289). Specifically, the ORB on the client receives communication from the replica. At this stage, the result may be intercepted by a client request interceptor. The client request interceptor reviews the request.

A determination is made whether the result includes an update to the cluster list (Step 291). Specifically, a determination is made whether an updated IOR exists in the service context of the request. The service context is accessed by the client request interceptor. If the IOR matches that sent by the client, then the result does not include the update. Accordingly, the result is transmitted to the client application.

However, if the result includes an update, then the membership label and cluster list is updated (Step 293). Specifically, the membership label is updated to reflect the membership label submitted in the IOR. The cluster list may be updated immediately or simply destroyed and recreated when another replica is required. Further, in one or more embodiments of the invention, the last replica identifier is not changed when an update is received. Thus, when the client is in communication with a replica, the client maintains communication with the same replica until the replica fails. Once the necessary updates are complete, the IOR interceptor ends processing and the result is transmitted to the client application.

In the following example, consider the scenario in which a dynamic cluster includes replica X, replica Y, and replica Z. Each replica is initially configured with a cluster list containing replica X, replica Y, and replica Z. Further, in the example, a client invokes methods on servant Q and servant P that are located on all three replicas.

Initially, the client submits a request for the IOR associated with servant Q on the name service of Replica X. The client receives the IOR, creates a stub, sets the membership label to the membership label defined in the IOR, and sets the last replica identifier to indicate replica X. Next, the client submits a request with the membership label to invoke a method on servant Q.

The ORB on the replica determines that the membership label matches the membership label of the replica, so the request is processed and a response is transmitted to the client.

The client also submits a request for the IOR associated with servant P on the name service of Replica X. The client receives the IOR, creates a stub, and sets the membership label to the membership label defined in the IOR. Next, the client determines that replica X is defined by the last replica identifier. Thus, the client submits a request with the membership label to invoke a method on servant P on replica X. However, the client does not receive a response. Accordingly, the client determines that replica X has failed.

In the meantime, replica Y and replica Z are also notified of the failure of replica X. Accordingly, replica Y and replica Z suspend processing of requests, destroy POAs, and update the membership label and the cluster list to include only replica Y and replica Z. Further, replica Y and replica Z update the ORTs to reflect the updated membership label and cluster list.

Continuing with the client in the example, the client next tries another replica on the cluster list given in the IOR last transmitted. The next replica is replica Y. Accordingly, the client updates the last replica identifier to reflect replica Y and submits a request to replica Y to invoke a method on servant P. The request includes the last known membership label in the service context.

A server request interceptor executing on replica Y intercepts the request and determines that the membership label is obsolete. Accordingly, the server request interceptor accesses the object key from the request and determines whether a POA exists for the request. If a POA does not exist, then a POA and new IOR are created. The IOR is then added to the service context of the request before the request is processed. Finally, a response is generated and transmitted to the client with the updated IOR in the service context.

A client request interceptor notices that an updated IOR is sent. Accordingly, the client request interceptor updates the cluster list and the membership label. The response is then passed to the client application that initiated the request.

Next, in the example, the client application submits a request to invoke a method on servant Q. The last replica identifier is accessed to determine that replica Y was the last replica for which the client is in communication. Accordingly, a request to invoke a method on servant Q is transmitted to replica Y that includes the updated membership label. Replica Y processes the request and transmits a response to the client.

Figure 8:
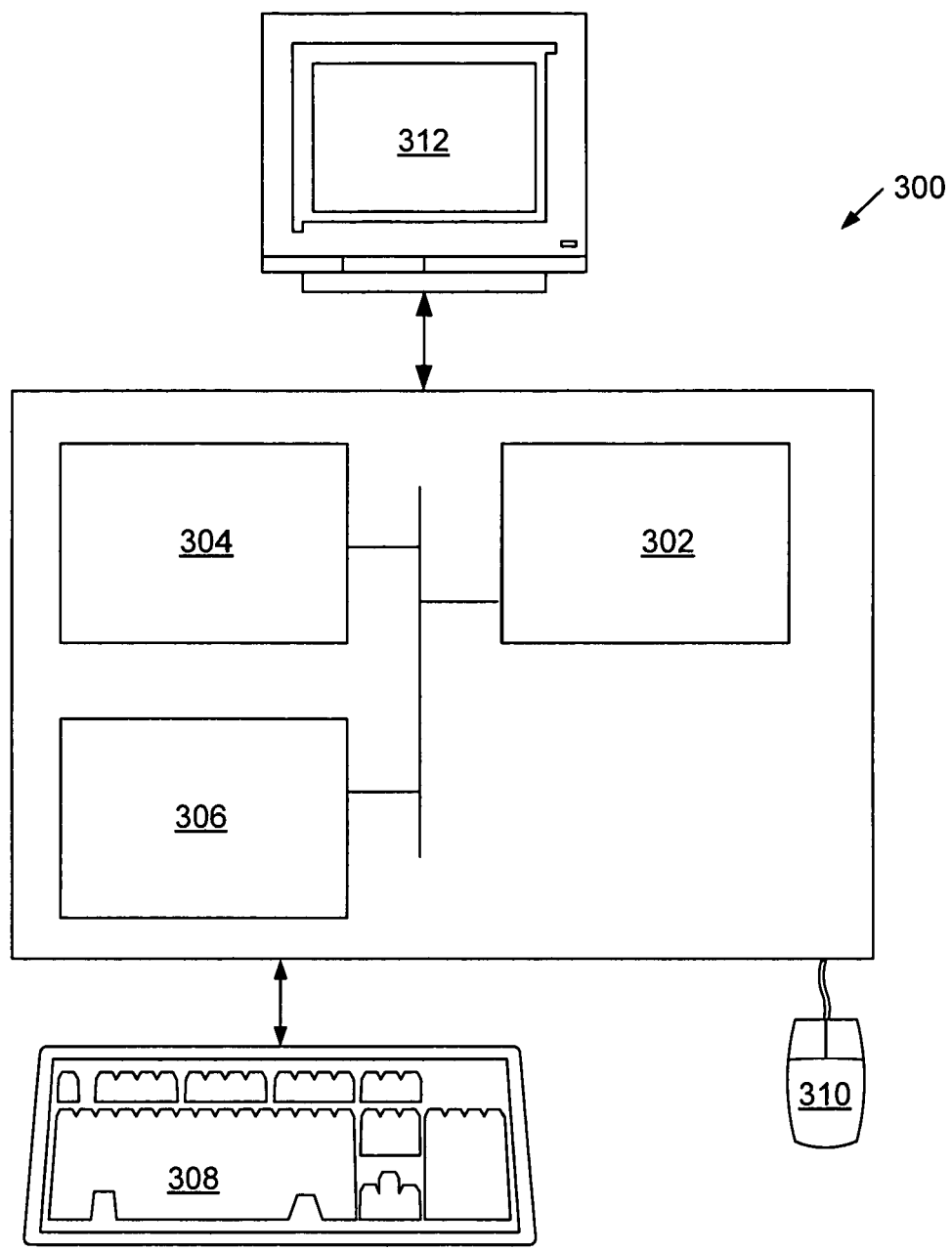
FIG. 8 shows a computer system in accordance with one or more embodiments of the invention.

Embodiments of the invention may be implemented on virtually any type of computer regardless of the platform being used. For example, as shown in FIG. 8, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, embodiments of the invention may be implemented on a distributed system having a plurality of nodes, where each portion of the invention (e.g., name service, server group manager, object request broker, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

Embodiments of the invention provide a mechanism for informing the client of changes in the membership of a dynamic cluster. Thus, new members may be added to the dynamic cluster and clients may communicate with the new members. Further, the clients are informed when members of the dynamic cluster fail. Thus, the clients do not waste time sending requests to known failed members.

Further, embodiments of the invention perform the communication at the level of the ORB. Specifically, rather then relying on individual messages and performing the updates at the message level, embodiments of the invention use interceptors to maintain cluster lists and perform the necessary communication to keep clients updated.

Also, embodiments of the invention provide a mechanism whereby clients continue communication with the same non-failed replica. Specifically, by keeping track of the last replica that communicates with the client, in the event of failure, the client transfers all the requests to the same new replica regardless of the servant in accordance with one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for servicing requests in a dynamic cluster comprising:
   receiving, by a first replica of a first plurality of replicas in the dynamic cluster, a first request comprising a first membership label from a client,
   wherein the first request comprises an object key and the object key comprises an obsolete object reference,
   wherein the client stores the first membership label and a first cluster list corresponding to the first membership label, and
   wherein the first cluster list comprises identifiers of the first plurality of replicas;
   identifying a reference factory corresponding to the object key;
   obtaining an object reference template from the reference factory;
   updating the obsolete object reference using the object reference template to create an updated object reference;
   determining, by the first replica, whether the first membership label is obsolete; and
   sending, by the first replica to the client, a second membership label and a second cluster list corresponding to the second membership label when the first membership label is obsolete,
   wherein the second cluster list comprises identifiers of a second plurality of replicas in the dynamic cluster,
   wherein the sending the second membership label and the second cluster list comprises:
      intercepting, from a servant, a first response comprising results to the first request to the client;
      adding the updated object reference to the first response, wherein the updated object reference comprises the second membership label and the second cluster list; and
      sending the first response to the client, wherein the first response sent to the client comprises the results and the updated object reference, and
   wherein the client updates the first cluster list with the second cluster list.

2. The method of claim 1, further comprising:
   receiving, by a second replica of the second plurality of replicas, a second request comprising the second membership label from the client; and
   sending a second response based on the second request to the client.

3. The method of claim 2, wherein the second replica is chosen to receive the second request based on a priority in the second cluster list.

4. The method of claim 1, wherein a header of the first request comprises an object key and a service context, and wherein the service context comprises the first membership label.

5. The method of claim 1, wherein determining whether the first membership label is obsolete comprises:

intercepting the first request by an interceptor executing on the first replica; and comparing the first membership label with a stored membership label.

6. The method of claim 1, wherein the object reference template comprises the second membership label and the second cluster list.

7. The method of claim 1, further comprising:

receiving notification of a cluster list change; and updating the reference factory to create an updated reference factory, wherein the updated reference factory comprises the object reference template with the second membership label and the second cluster list.

8. The method of claim 7, further comprising:

destroying an obsolete object adaptor maintained by the reference factory in response to the notification; and creating a new object adaptor by the updated reference factory when the first request is received, wherein the updated object reference is created using the new object adaptor.

9. The method of claim 8, wherein creating a new object adaptor is performed using an adaptor activator.

10. The method of claim 1, further comprising:

receiving a notification of a cluster list change;

generating the second membership label by the first replica in response to the notification; and generating a third membership label by a second replica in response to the notification, wherein the second membership label and the third membership label are distinct.

11. The method of claim 1, further comprising:

storing a last replica identifier by the client, wherein requests are transmitted only to a last replica identified by the last replica identifier until the last replica fails, wherein the last replica identifier identifies the first replica when the first request is received by the first replica.

12. A system comprising:

a first replica of a first plurality of replicas, the first replica comprising:

a first processor; and a first set of instructions that when executed by the first processor causes the first processor to:

receive a first request comprising a first membership label from a client, wherein the first request comprises an object key and the object key comprises an obsolete object reference, wherein the client stores the first membership label and a first cluster list corresponding to the first membership label, and wherein the first cluster list comprises identifiers of the first plurality of replicas, identify a reference factory corresponding to the object key;

obtain an object reference template from the reference factory;

update the obsolete object reference using the object reference template to create an updated object reference;

determine whether the first membership label is obsolete; and send, to the client, a second membership label and a second cluster list corresponding to the second membership label when the first membership label is obsolete, wherein the second cluster list comprises identifiers of a second plurality of replicas, wherein the sending the second membership label and the second cluster list comprises:

intercepting, from a servant, a first response comprising results to the first request to the client;

adding the updated object reference to the first response, wherein the updated object reference comprises the second membership label and the second cluster list; and sending the first response to the client, wherein the first response sent to the client comprises the results and the updated object reference, and wherein the client updates the first cluster list with the second cluster list; and a second replica of the second plurality of replicas, the second replica comprising:

a second processor; and a second set of instructions that when executed by the second processor causes the second processor to:

receive a second request comprising the second membership label from the client; and send a second response based on the second request to the client.

13. The system of claim 12, wherein a header of the first request comprises an object key and a service context, and wherein the service context comprises the first membership label.

14. The system of claim 13, further comprising:

a server group manager configured to execute on the first replica, wherein the server group manager determines whether the first membership label is obsolete, wherein determining whether the first membership label is obsolete comprises:

intercepting the first request by an interceptor executing on the first replica;

accessing the service context of the first request by the interceptor; and comparing the first membership label with a stored membership label.

15. The system of claim 12, wherein the client stores a last replica identifier, and wherein requests are transmitted only to a last replica identified by the last replica identifier until the last replica fails, wherein the last replica identifier identifies the first replica when the first request is received by the first replica.

16. A computer readable medium comprising computer readable program code embodied therein for causing a replica of a first plurality of replicas in a dynamic cluster to:

receive a request comprising a first membership label from a client, wherein the request comprises an object key and the object key comprises an obsolete object reference, wherein the client stores the first membership label and a first cluster list corresponding to the first membership label, and wherein the first cluster list comprises identifiers of the first plurality of replicas;

identify a reference factory corresponding to the object key;

obtain an object reference template from the reference factory;

update the obsolete object reference using the object reference template to create an updated object reference;
determine whether the first membership label is obsolete; and
send, to the client, a second membership label and a second cluster list corresponding to the second membership label when the first membership label is obsolete,
wherein the second cluster list comprises identifiers of a second plurality of replicas in the dynamic cluster,
wherein the sending the second membership label and the second cluster list comprises:

intercepting, from a servant, a response comprising results to the first request to the client;
adding the updated object reference to the response, wherein the updated object reference comprises the second membership label and the second cluster list; and
sending the response to the client, wherein the first response sent to the client comprises the results and the updated object reference, and
wherein the client updates the first cluster list with the second cluster list.

* * * * *

UNITED STATES PATENT AND TRADEMARK OFFICE
CERTIFICATE OF CORRECTION

PATENT NO.        : 7,743,167 B2                                               Page 1 of 1
APPLICATION NO.   : 11/604004
DATED             : June 22, 2010
INVENTOR(S)       : Harold Carr et al.

It is certified that error appears in the above-identified patent and that said Letters Patent is hereby corrected as shown below:

In column 3, line 4, delete "each" and insert -- Each --, therefor.

In column 5, line 19-29, delete "Additionally, the cluster list (140) may contain status information (e.g., receiving requests, halted, unknown, etc.) about the replicas. In one or more embodiments, a failed replica may be listed in the cluster list with the status information indicating that the replica has failed. In other embodiments, a failed replica is not listed in the cluster list. In one or more embodiments of the invention, the cluster list (140) is ordered based on a priority. Further, in one or more embodiments of the invention, the cluster list (140) may list only the members of the dynamic cluster having the corresponding servant specified by the IOR." and insert the same as continuation of paragraph, after "name, address (e.g., hostname and port), etc." on col. 5, line 18.

In column 13, line 60, delete "then" and insert -- than --, therefor.

Signed and Sealed this
Twenty-sixth Day of July, 2011

David J. Kappos
*Director of the United States Patent and Trademark Office*